United States Patent
Jornod et al.

(10) Patent No.: US 11,184,793 B2
(45) Date of Patent: Nov. 23, 2021

(54) METHODS, APPARATUSES AND COMPUTER PROGRAMS FOR A TRANSPORTATION VEHICLE AND FOR A BASE STATION OF A MOBILE COMMUNICATION SYSTEM

(71) Applicant: VOLKSWAGEN AKTIENGESELLSCHAFT, Wolfsburg (DE)

(72) Inventors: Guillaume Jornod, Berlin (DE); Daniel Reimann, Braunschweig (DE)

(73) Assignee: Volkswagen Aktiengesellschaft

( * ) Notice: Subject to any disclaimer, the term of this patent is extended or adjusted under 35 U.S.C. 154(b) by 36 days.

(21) Appl. No.: 16/832,130

(22) Filed: Mar. 27, 2020

(65) Prior Publication Data
US 2020/0314685 A1 Oct. 1, 2020

(30) Foreign Application Priority Data

Mar. 28, 2019 (EP) .................................... 19165902

(51) Int. Cl.
*H04W 28/02* (2009.01)
*H04W 4/44* (2018.01)
(Continued)

(52) U.S. Cl.
CPC ......... *H04W 28/0268* (2013.01); *H04W 4/44* (2018.02); *H04W 48/16* (2013.01); *H04W 48/20* (2013.01)

(58) Field of Classification Search
CPC ... H04W 28/0268; H04W 4/44; H04W 48/16; H04W 48/20; H04W 28/24; H04W 4/40
See application file for complete search history.

(56) References Cited

U.S. PATENT DOCUMENTS

| | | | |
|---|---|---|---|
| 2007/0195788 A1* | 8/2007 | Vasamsetti | H04W 28/24 370/395.21 |
| 2011/0021202 A1* | 1/2011 | Rosen | H04W 72/087 455/450 |

(Continued)

FOREIGN PATENT DOCUMENTS

| | | |
|---|---|---|
| WO | 2010067999 A2 | 6/2010 |
| WO | 2014071974 A1 | 5/2014 |

(Continued)

OTHER PUBLICATIONS

Search Report for European Patent Application No. 19165902.8; dated Sep. 19, 2019.

*Primary Examiner* — Harry H Kim
(74) *Attorney, Agent, or Firm* — Barnes & Thornburg LLP

(57) ABSTRACT

Methods, apparatuses and computer programs for a transportation vehicle and for a base station of a mobile communication system. The method for the transportation vehicle includes transmitting a request to a base station of a mobile communication system, wherein the request relates to a service having a pre-defined Quality of Service (QoS) requirement; receiving a response to the request from the base station, wherein the response indicates that the service is unavailable from the base station at the pre-defined QoS requirement and wherein the response includes information related to one or more alternatives to the requested service; and transmitting an updated version of the request, wherein the updated version is based on the one or more alternatives.

18 Claims, 3 Drawing Sheets

(51) Int. Cl.
*H04W 48/16* (2009.01)
*H04W 48/20* (2009.01)
*H04W 28/24* (2009.01)

(56) References Cited

U.S. PATENT DOCUMENTS

| | | | |
|---|---|---|---|
| 2016/0100329 A1* | 4/2016 | Miller | H04L 1/0017 |
| | | | 370/235 |
| 2016/0105821 A1* | 4/2016 | Senarath | H04W 76/00 |
| | | | 370/329 |
| 2016/0192261 A1* | 6/2016 | Wang | H04W 36/16 |
| | | | 370/331 |
| 2016/0262068 A1* | 9/2016 | Won | H04L 67/12 |
| 2019/0230645 A1* | 7/2019 | Cheng | H04W 12/08 |
| 2019/0281491 A1* | 9/2019 | Cheng | H04W 72/1236 |

FOREIGN PATENT DOCUMENTS

| | | | |
|---|---|---|---|
| WO | 2017175039 A1 | 10/2017 | |
| WO | 2018125686 A2 | 7/2018 | |
| WO | 2019081027 A1 | 5/2019 | |
| WO | WO-2019081027 A1 * | 5/2019 | H04W 72/1263 |

* cited by examiner

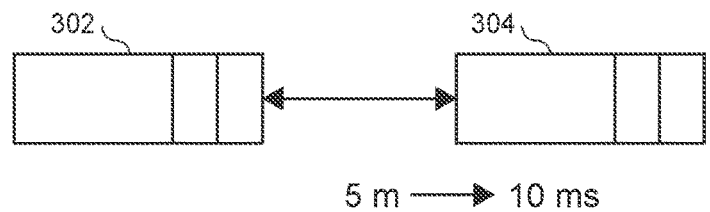
Fig. 3a
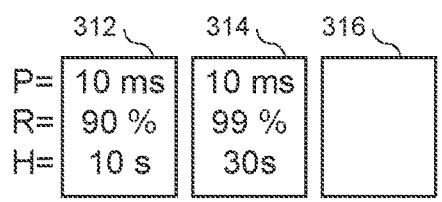
Fig. 3b
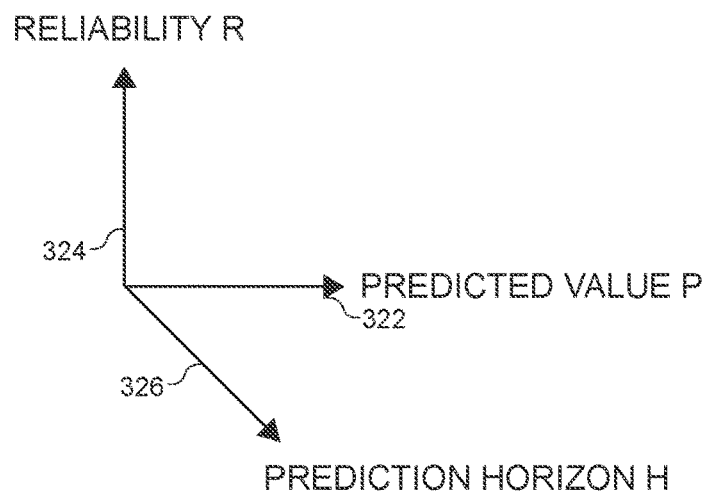
Fig. 3c
Fig. 3d

METHODS, APPARATUSES AND COMPUTER PROGRAMS FOR A TRANSPORTATION VEHICLE AND FOR A BASE STATION OF A MOBILE COMMUNICATION SYSTEM

PRIORITY CLAIM

This patent application claims priority to European Patent Application No. 19165902.8, filed 28 Mar. 2019, the disclosure of which is incorporated herein by reference in its entirety.

SUMMARY

Illustrative embodiments relate to methods, apparatuses and computer programs for a transportation vehicle and for a base station of a mobile communication system, more particularly, but not exclusively, to a concept for providing suitable alternatives in case a desired QoS requirement is unavailable from a base station of a mobile communication system.

BRIEF DESCRIPTION OF THE DRAWINGS

Disclosed embodiments will be described with reference to the accompanying figures, in which:

FIGS. 3a to 3d show schematic drawings of an exemplary embodiment.

DETAILED DESCRIPTION

Figure 1A:
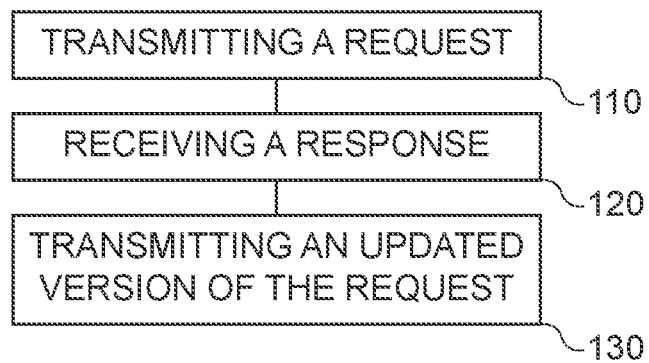
FIG. 1a shows a flow chart of an exemplary embodiment of a method for a transportation vehicle.

Vehicular communication is a field of research and development. To enable an autonomous or semi-autonomous driving of the transportation vehicles, transportation vehicles are expected to use Vehicle-to-Vehicle-Communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems. Such communication may, e.g., be used to implement vehicular communication services, i.e., services that are employed by a transportation vehicle and that are based on a reliable communication between the transportation vehicle and further transportation vehicles or between the transportation vehicle and the backend services. Such services may, e.g., be tele-operated driving services (in which the communication occurs between the transportation vehicle and the backend service) or coordinated driving services, such as a lane merge service (in which the communication may predominately occur between the transportation vehicle and further transportation vehicles in the vicinity of the transportation vehicle) or a platooning service. Such services often rely on a Quality of Service (QoS) functionality of a mobile communication system over which the communication is performed: For example, in tele-operated driving, to provide a safe service, the maximal latency might be required to be below a first threshold (e.g., below 20 ms), and a minimal data transmission data rate might be required to be above a second threshold (e.g., above 1 Mbit/s).

International patent application WO 2017/175039 A1 discloses a method and apparatus for end-to-end QoS/QoE (Quality of Service/Quality of Experience) management in 5G systems. In this application, the QoS management is performed on a per-application basis instead of a per-device basis.

International patent application WO 2018/125686 A1 discloses methods and devices for radio communications. In this application, various QoS concepts are employed.

There may be a desire to provide an improved concept for radio resource management in vehicular communication that takes into account the QoS requirements of the services used by the transportation vehicles.

Disclosed embodiments are based on the finding that, as a multitude of transportation vehicles are handled by the same base station of a mobile communication system, the wireless resources that are available to the base station might not suffice to service all requests that are provided by the transportation vehicles. Instead, the base stations may try to provide all of the transportation vehicles with a fair share of the wireless resources. In vehicular services, e.g., in safety-critical services such as tele-operated driving or assisted merging, this might not suffice, as the vehicular services often rely on the timely and dependable transmission of data. As the so-called Quality of Service (QoS) requirements of vehicular services are known in advance, the transportation vehicles may transmit a request to a base station that includes the QoS requirement of the service the transportation vehicle requests from the base station. If sufficient wireless resources are available for the base station to service the request, the base station may provide a communication link to the transportation vehicle that is suitable for the QoS requirement of the (vehicular) service. If insufficient resources are available, the base station may provide the transportation vehicle with one or more alternatives to the requested service. The one or more alternatives may, e.g., comprise lower QoS requirements, e.g., based on lower content data rates or based on changes in the type of service (e.g., three-dimensional perception data instead of video), or they may be provided by a different base station. The transportation vehicle may use one of the one or more alternatives to reformulate the request and use the service.

Disclosed embodiments provide a method for a transportation vehicle. The method comprise transmitting a request to a base station of a mobile communication system. The request relates to a service having a pre-defined Quality of Service (QoS) requirement. The method comprises receiving a response to the request from the base station. The response indicates that the service is unavailable from the base station at the pre-defined QoS requirement. The response comprises information related to one or more alternatives to the requested service. The method comprises transmitting an updated version of the request. The updated version is based on the one or more alternatives. By receiving the one or more alternatives to the requested service, the transportation vehicle may choose a service with a QoS requirement that is supported, which may avoid using a service at an insufficient QoS.

The one or more alternatives to the requested service may comprise at least a subset of alternatives to the requested service that are provided via the base station of the mobile communication system. This may enable using the same base station, albeit at a service that differs from the initially requested service.

The updated version of the request may be transmitted to the base station of the mobile communication system. This may initiate a communication link that may be used for the service.

The subset of alternatives to the requested service that are provided via the base station of the mobile communication system may have lower QoS properties than the pre-defined QoS requirement. The updated version of the request may be based on an alternative that has a lower QoS property than the pre-defined QoS requirement. By using a service a with a lower QoS requirement, the same base station may be used for the service.

For example, at least a part of the subset of alternatives to the requested service that are provided via the base station of the mobile communication system have lower QoS properties than the pre-defined QoS requirement due to a change in a content data rate of the service. Alternatively or additionally, at least a part of the subset of alternatives to the requested service that are provided via the base station of the mobile communication system have lower QoS properties than the pre-defined QoS requirement due to a change to a different type of service. Both alternatives may lead to lower QoS requirements.

The one or more alternatives to the requested service may comprise at least a subset of alternatives to the requested service that are provided via a different base station of the mobile communication system or via a base station of a different mobile communication system. This may enable a use of a different base station that may support a more stringent QoS requirement, e.g., the QoS requirement of the initial service request.

The updated version of the request may be transmitted to the different base station of the mobile communication system or to the base station of the different mobile communication system. This may initiate a communication link that may be used for the service.

For example, the subset of alternatives to the requested service that are provided via a different base station of the mobile communication system or via a base station of a different mobile communication system may provide the same service via the different base station of the mobile communication system or via a different radio access technology via the base station of the different mobile communication system. Both the different base station of the same mobile communication system and a base station of a different mobile communication system may be able to provide the service at the initially requested QoS requirement.

In some disclosed embodiments, the information related to one or more alternatives to the requested service comprises information related to a predicted QoS of the one or more alternatives to the requested service. The method may comprise selecting one of the one or more alternatives based on the predicted QoS of the one or more alternatives to the requested service. This may enable a more reliable selection of one of the alternatives.

For example, the information related to the predicted QoS may comprise the predicted QoS over one or more pre-defined time intervals and/or based on one or more confidence intervals. This may enable an improved selection of one of the alternatives, e.g., based on an estimated duration of an execution of the service or based on an impact of a violation of a QoS requirement.

The method may be executed by the transportation vehicle. The mobile communication system may be a vehicular mobile communication system. For example, the service may be a vehicular communication service. The service may be one of a tele-operated driving service, a lane merge assistance service, and an overtake assistance service. Such services may benefit from a reliable support of QoS requirements.

Disclosed embodiments further provide a method for a base station of a mobile communication system. The method comprises receiving a request from a transportation vehicle via the mobile communication system. The request relates to a service having a pre-defined QoS requirement. The method comprises determining, whether the service is available from the base station at the pre-defined QoS requirement. The method comprises determining one or more alternatives to the requested service, if the service is unavailable from the base station at the pre-defined QoS requirement. The method comprises transmitting a response to the request to the transportation vehicle. The response indicates that the service is unavailable from the base station at the pre-defined QoS requirement. The response comprises information related to the one or more alternatives to the requested service. By transmitting the one or more alternatives to the requested service, the transportation vehicle may choose a service with a QoS requirement that is supported, which may avoid using a service at an insufficient QoS.

For example, the one or more alternatives to the requested service comprises at least a subset of alternatives to the requested service that are provided via the base station of the mobile communication system. Alternatively or additionally, the one or more alternatives to the requested service may comprise at least a subset of alternatives to the requested service that are provided via a different base station of the mobile communication system or via a base station of a different mobile communication system. Both the same base station and a different base station may provide a viable service to the transportation vehicle.

Disclosed embodiments further provide a computer program having a program code for performing at least one of the methods, when the computer program is executed on a computer, a processor, or a programmable hardware component.

Disclosed embodiments further provide an apparatus for a transportation vehicle. The apparatus comprises at least one interface for communicating with a base station of a mobile communication system. The apparatus comprises a control module configured to transmit a request to the base station of the mobile communication system. The request relates to a service having a pre-defined QoS requirement. The control module is configured to receive a response to the request from the base station. The response indicates that the service is unavailable from the base station at the pre-defined QoS requirement. The response comprises information related to one or more alternatives to the requested service. The control module is configured to transmit an updated version of the request. The updated version is based on the one or more alternatives. Disclosed embodiments further provide a transportation vehicle comprising the apparatus.

Disclosed embodiments further provide an apparatus for a base station of a mobile communication system. The apparatus comprises at least one interface for communicating with a transportation vehicle via the mobile communication system. The apparatus comprises a control module configured to receive a request from a transportation vehicle via the mobile communication system. The request relates to a service having a pre-defined QoS requirement. The control modules is configured to determine, whether the service is available from the base station at the pre-defined QoS requirement. The control module is configured to determine one or more alternatives to the requested service if the service is unavailable from the base station at the pre-defined QoS requirement. The control module is configured to transmit a response to the request to the transportation vehicle. The response indicates that the service is unavailable from the base station at the pre-defined QoS requirement. The response comprises information related to the one or more alternatives to the requested service. Disclosed embodiments further comprise the base station comprising the apparatus. Disclosed embodiments further comprise a system comprising the base station and one or more transportation vehicles (as described above).

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1a shows a flow chart of an exemplary embodiment of a method for a transportation vehicle 100. The method comprises transmitting 110 a request to a base station 200 of a mobile communication system 300. The request relates to a service having a pre-defined Quality of Service, QoS, requirement. The method comprises receiving 120 a response to the request from the base station 200. The response indicates that the service is unavailable from the base station 200 at the pre-defined QoS requirement. The response comprises information related to one or more alternatives to the requested service. The method comprises transmitting 130 an updated version of the request. The updated version is based on the one or more alternatives. The method may be executed by the transportation vehicle 100. For example, the transportation vehicle 100 may be motorized transportation vehicle, e.g., a car, a truck or a motorbike. In some disclosed embodiments, the transportation vehicle might also be an autonomous or tele-operated drone, such as an aerial drone or an underwater drone.

Figure 1B:
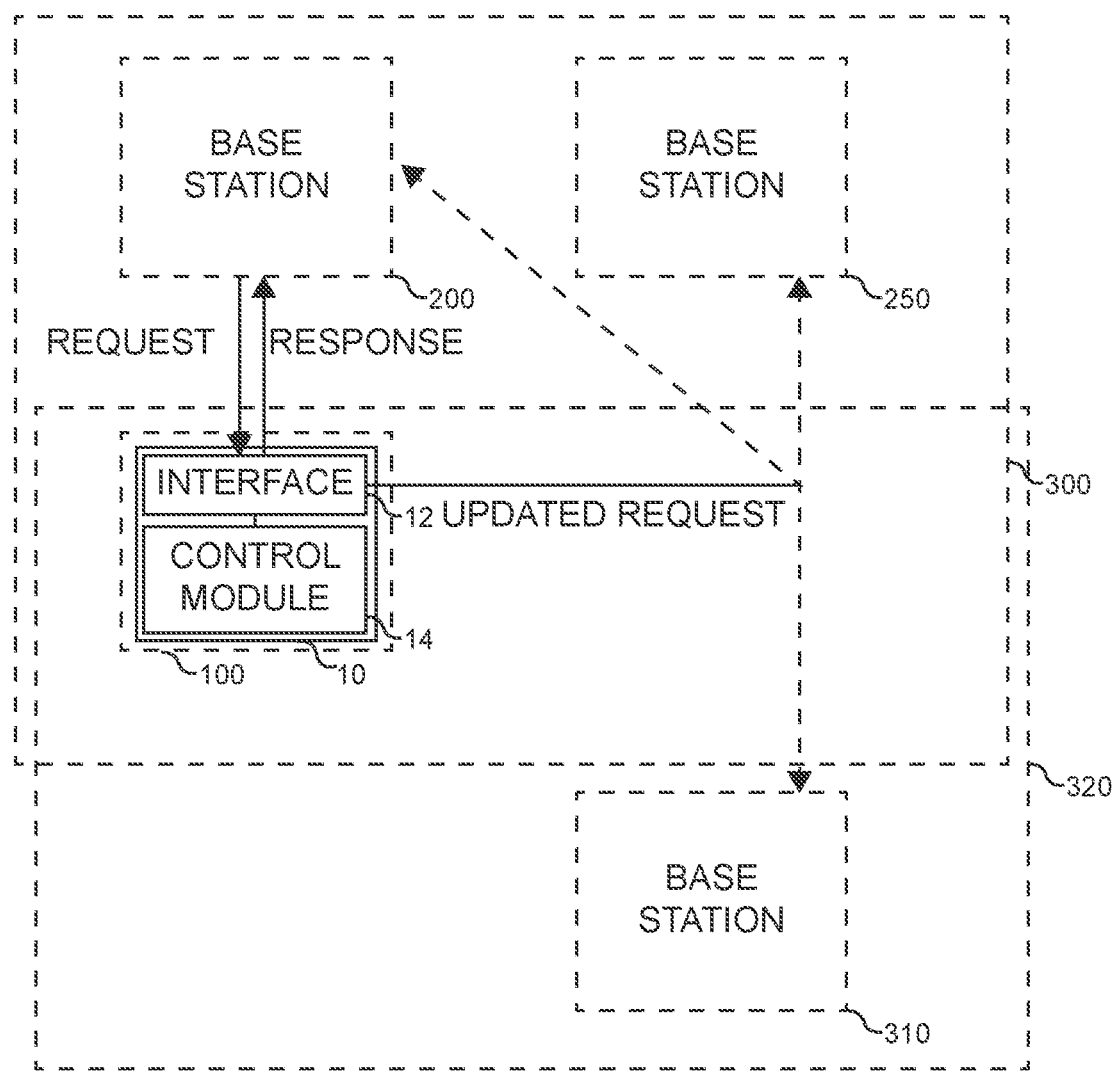
FIG. 1b shows a block diagram of an exemplary embodiment of an apparatus for a transportation vehicle.

FIG. 1b shows a block diagram of an exemplary embodiment of a (corresponding) apparatus 10 for a transportation vehicle 100. The apparatus 10 comprises at least one interface 12 for communicating with a base station 200 of a mobile communication system 300. The apparatus 10 comprises a control module 14 that is coupled to the at least one interface 12. The control module 14 may be configured to execute the method of FIGS. 1a and/or 1b, e.g., in conjunction with the at least one interface. The control module 14 is configured to transmit a request to the base station 200 of the mobile communication system 300 (via the at least one interface 12). The request relates to a service having a pre-defined Quality of Service (QoS) requirement. The control module is configured to receive a response to the request from the base station 200 (via the at least one interface 12). The response indicates that the service is unavailable from the base station 200 at the pre-defined QoS requirement. The response comprises information related to one or more alternatives to the requested service. The control module 14 is configured to transmit an updated version of the request (via the at least one interface 12). The updated version is based on the one or more alternatives. FIG. 1b further shows the transportation vehicle 100 comprising the apparatus 10, and a system comprising both the transportation vehicle 100 and the base station 200. The system may further comprise a further base station 250 of the mobile communication system and/or a base station 310 of a further mobile communication system.

The following description relates to both the method of FIG. 1a and the apparatus 10 of FIG. 1b.

At least some disclosed embodiments relate to a method and an apparatus for a transportation vehicle 100. The transportation vehicle may be any mobile vehicular transceiver that is capable of communicating within the mobile communication system 300, e.g., as a UE (User Equipment) of the mobile communication system 300. In at least some disclosed embodiments, the apparatus may be included in or may correspond to a communication unit of a transportation vehicle. Accordingly, the method may be executed by the transportation vehicle.

The method comprises transmitting 110 (or more general "providing") the request to a base station 200 of the mobile communication system 300 (e.g., via the mobile communication system 300). For example, the request may be provided to a transceiver of the transportation vehicle 100, and may be transmitted by the transceiver of the transportation vehicle to the base station 200.

For example, the request may request the base station 200 to allocate or reserve wireless resources for the transportation vehicle 100, e.g., for a communication link between the transportation vehicle and the base station or for one or more communication links between the transportation vehicle and one or more other transportation vehicles, to enable the use of the service by the transportation vehicle. In some other examples, the request may request the base station 200 to establish a wireless bearer with a QoS configuration that matches or exceeds the QoS requirement of the service, e.g., for a communication link between the transportation vehicle and the base station.

For example, the base station 200 of the mobile communication system may be an evolved Node B (eNodeB) or a gNodeB of the mobile communication system. Alternatively, a transportation vehicle may act as mobile base station of the mobile communication system, e.g., to provide a scheduling of side-link communication of the mobile communication system. In some examples, the base station 200 may also generate the response to the request. Alternatively, the response to the request may be generated by another stationary entity (that may be located in the core network of the mobile communication system) and transmitted by the base station 200.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In at least some disclosed embodiments, the mobile communication system may be a vehicular communication system, e.g., a vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between transportation vehicles, and Uu, which is used between transportation vehicles and base stations. Using PC5 and Uu, the mobile communication system may support direct vehicle-to-vehicle communication (without involvement of a base station as a communication hop, using PC5, either managed by the base station or autonomously), i.e., side-link communication, vehicle-to-vehicle communication via a base station of the mobile communication system, and vehicle-to-network communication via a base station of the mobile communication system. The direct vehicle-to-vehicle communication may be based on the same radio resources (e.g., the same frequency resources) as the communication via the base station of the transportation vehicle.

The request relates to the service having the pre-defined QoS requirement. For example, the service may be a vehicular communication service, also denoted "connected transportation vehicle communication services, or short connected services". Connected services may, e.g., be left turning assist at a crossing, overtake assist at rural road, etc. Connected services, such as the service, may be connected transportation vehicle functions that require communications between the transportation vehicle and other transportation vehicles or between the transportation vehicle and a backend server/service in the execution of the connected transportation vehicle functions. For example, the service may be one of a tele-operated driving service, a lane merge assistance service, an overtake assistance service, and a platooning service. In at least some disclosed embodiments, the service is based on a communication link between the transportation vehicle and the base station (i.e., a server via the base station, such as in a tele-operated driving service), e.g., based on uplink/downlink (i.e., Uu) communication. Alternatively or additionally, the service may be based on one or more communication links between the transportation vehicle and one or more other transportation vehicles (e.g., in a platooning service). A platooning service is a coordinated driving service, in which a plurality of transportation vehicles travel in a coordinated state, at the same velocity and with low inter-vehicle distances (i.e., lower than 15 m or lower than 10 m). The one or more communication links between the transportation vehicle and one or more other transportation vehicles may be based on side-link communication (i.e., communication directly between the transportation vehicles), which may use wireless resources that are allocated to the transportation vehicle and the one or more other transportation vehicles by the base station. In this case, the request for the service may request the base station to allocate the wireless resources to establish and maintain the one or more communication links between the transportation vehicle and one or more other transportation vehicles.

In at least some disclosed embodiments, the QoS requirement may be based on one or more QoS criteria. For example, the QoS requirement may correspond to one or more QoS properties that are to be fulfilled to use the service. For example, the QoS requirement may define at least one of a desired maximal or average latency, a desired minimal data transmission rate (e.g., for at least one of uplink, downlink and sidelink communication), and a desired maximal packet loss or error rate. The QoS requirement may match one of a plurality of QoS profiles that are supported by the mobile communication system 300. For example, the request may request the base station to establish a wireless bearer that has a QoS profile that matches (or exceeds) the QoS requirement of the service.

The method comprises receiving 120 (or more general "obtaining") the response to the request from the base station 200 (e.g., via the mobile communication system 300). For example, the response may be received from the base station 200 by a transceiver of the transportation vehicle 100 and obtained from the transceiver. The response indicates that the service is unavailable from the base station 200 at the pre-defined QoS requirement. For example, the response may comprise a field that specifies that the request is denied. In addition to the indication/denial, the response specifies alternatives to the requested service.

The alternatives to the requested service may either be provided by the same base station, by a different base station of the same mobile communication system, or by a different base station of a different mobile communication system. For example, the one or more alternatives to the requested service may comprise at least a subset of alternatives to the requested service that are provided via the base station 200 of the mobile communication system 300. In this context "provided via the base station 200" is not limited to "the service is provided by the base station" or "a communication link of the service is established/maintained between the transportation vehicle and the base station", but may also include "wireless resources to be used for one or more communication links of the service are allocated/reserved by the base station".

In many cases, in which a service is unavailable from the base station 200, the unavailability may be due to a lack of wireless resources. Accordingly, services, that have less stringent QoS requirements, may be available via the base station 200. In other words, the subset of alternatives to the requested service that are provided via the base station 200 of the mobile communication system 300 may have lower (i.e., less stringent) QoS properties than the pre-defined QoS requirement. The updated version of the request may be based on an alternative (of the one or more alternatives) that has a lower QoS property than the pre-defined QoS requirement.

For example, a lower QoS property may be achieved by using a lower quality setting in the transmission of content data (e.g., video data or audio data). In other words, at least a part (i.e., at least some alternatives) of the subset of alternatives to the requested service that are provided via the base station 200 of the mobile communication system 300 have lower QoS properties than the pre-defined QoS requirement due to a change in a content data rate of the service (i.e., the same service having a lower content data rate). Alternatively or additionally, the QoS properties may be lower as the service itself is changed, e.g., from video to three-dimensional depth data, from audio and video to video only etc. In other words, at least a part (i.e., at least some alternatives) of the subset of alternatives to the requested service that are provided via the base station 200 of the mobile communication system 300 have lower QoS properties than the pre-defined QoS requirement due to a change to a different type of service.

In some disclosed embodiments, at least some alternatives of the subset of alternatives to the requested service that are provided via the base station 200 may have the same or higher (i.e., more stringent) QoS properties than the pre-defined QoS requirement, e.g., if the alternative uses side-link communication instead of uplink/downlink communication or vice versa.

In various disclosed embodiments, at least some of the alternatives may be provided by a different base station. In other words, the one or more alternatives to the requested service may comprise at least a subset of alternatives to the requested service that are provided via a different base station 250 of the mobile communication system 300 or via a base station 310 of a different mobile communication system 320. For example, the different base station and/or the base station of the different mobile communication system may be implemented similar to the base station 200. The different mobile communication system may be implemented similar to the mobile communication system.

The subset of alternatives to the requested service that are provided via a different base station 250 of the mobile communication system 300 or via a base station 310 of a different mobile communication system 320 may provide the same service via the different base station 250 of the mobile communication system 300 or via a different radio access technology (i.e., 5G-V2X instead of LTE-V2X) via the base station 310 of the different mobile communication system 320. Alternatively, the subset of alternatives to the requested service that are provided via a different base station 250 of the mobile communication system 300 or via a base station 310 of a different mobile communication system 320 may provide a different service (e.g., a service having a lower or higher QoS property, or a service that uses side-link communication instead of uplink/downlink communication or vice versa) via the different base station 250 of the mobile communication system 300 or via a different radio access technology via the base station 310 of the different mobile communication system 320.

The method comprises transmitting 130 an updated version of the request. For example, the updated version of the request may be transmitted to the base station 200 of the mobile communication system 300, e.g., if an alternative of the one or more alternatives is selected that is provided via the base station 200. Alternatively, the updated version of the request is transmitted to the different base station 250 of the mobile communication system 300 or to the base station 310 of the different mobile communication system 320, e.g., if an alternative of the one or more alternatives is selected that is provided via the different base station 250 of the mobile communication system 300 or via the base station 310 of the different mobile communication system 320.

The updated version is based on the one or more alternatives. For example, the method may comprise selecting one of the one or more alternatives for the updated version of the request, e.g., based on the information related to the one or more alternatives.

In at least some disclosed embodiments, the alternative of the one or more alternatives may be selected based on a predicted QoS of the selected alternative. For example, each alternative of the one or more alternatives may be associated with a prediction of a Quality of Service of the alternative, i.e., a prediction, as to which QoS is envisaged in the alternative, and as to and as to how reliable the prediction is (i.e., how likely it is, that the predicted QoS can be provided). In other words, the information related to one or more alternatives to the requested service may comprise information related to a predicted QoS of the one or more alternatives to the requested service. For example, the QoS may be predicted using different QoS criteria, e.g., a maximal or average latency, a minimal data transmission rate, a maximal packet loss or error rate, a maximal packet delay variation. The information related to the predicted QoS may indicate for each alternative of the one or more alternatives a QoS that is envisaged in the alternative. For example, the information related to the predicted QoS may comprise for each alternative of the one or more alternatives at least one element of the group of a predicted maximal or average latency, a predicted minimal transmission data rate, a predicted maximal packet loss or error rate, and a predicted maximal packet delay variation. In other words, the predicted QoS may comprise at least one element of the group of a predicted maximal or average latency, a predicted guaranteed or minimal transmission data rate, a predicted maximal packet loss or error rate, and a predicted maximal packet delay variation. Furthermore, the information related to the predicted QoS may indicate for each alternative of the one or more alternatives a confidence interval of the prediction of the QoS (i.e., how reliable the prediction is). In other words, information related to the predicted QoS may comprise information related to a reliability of the prediction of the QoS over a pre-defined time interval. For example, the information related to the predicted QoS may comprise the predicted QoS over one or more pre-defined time intervals (e.g., over 5 s, over 10 s and over 15 s) and/or based on one or more confidence intervals (e.g., 90%, 95% and 99%). The method may comprise selecting one of the one or more alternatives based on the predicted QoS of the one or more alternatives to the requested service.

Alternatively or additionally, one or more other criteria may be used in the selection of the alternative. For example, the one or more alternatives may be selected for the updated version of the request based on a type of the service of the alternative. For example, two alternatives are provided, one that comprises a transmission of video data, and another one that comprises a transmission of three-dimensional perception sensor data, leading to a first tele-operated driving service that is based on the transmission of the video data, and a second tele-operated driving service that is based on the three-dimensional perception sensor data. The transportation vehicle may select the one alternative that is the favored option, i.e., the three-dimensional perception sensor data if the perception sensors of the transportation vehicle are superior to the video sensors of the transportation vehicle.

The at least one interface 12 may correspond to one or more inputs and/or outputs for receiving and/or transmitting information, which may be in digital (bit) values according to a specified code, within a module, between modules or between modules of different entities. In some disclosed embodiments, the at least one interface 12 may comprise or may be coupled to a transceiver of the transportation vehicle. The transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The at least one interface may be configured to communicate via the mobile communication system via the transceiver. In other words, the transceiver may be configured to communicate via the mobile communication system 300.

In disclosed embodiments the control module 14 may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

More details of the method and apparatus are mentioned in connection with the proposed concept or one or more examples described above or below (e.g., FIGS. 2a to 3d). The method and/or apparatus may comprise one or more additional optional features corresponding to one or more facets of the proposed concept or one or more examples described above or below.

Figure 2A:
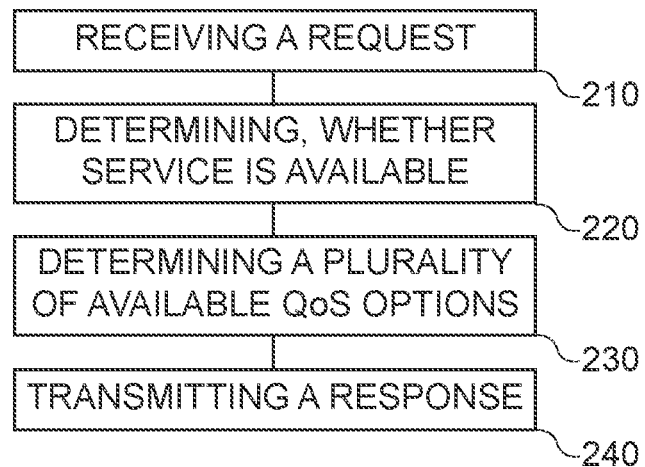
FIG. 2a shows a flow chart of an exemplary embodiment of a method for a base station of a mobile communication system.

FIG. 2a shows a flow chart of an exemplary embodiment of a method for a base station 200 of a mobile communication system 300. The method comprises receiving 210 a request from a transportation vehicle 100 via the mobile communication system 300. The request relates to a service having a pre-defined Quality of Service (QoS) requirement. The method comprises determining 220, whether the service is available from the base station 200 at the pre-defined QoS. The method comprises determining 230 one or more alternatives to the requested service if the service is unavailable from the base station 200 at the pre-defined QoS requirement. The method comprises transmitting 240 a response to the request to the transportation vehicle 100. The response indicates that the service is unavailable from the base station 200 at the pre-defined QoS requirement. The response comprises information related to the one or more alternatives to the requested service. For example, the method may be executed by the base station 200 of the mobile communication system. Alternatively, the method may be executed by another mobile or stationary entity of the mobile communication system, e.g., an entity located in a core network of the mobile communication system. In some disclosed embodiments, a transportation vehicle may act as base station 200, and the method may be executed by the transportation vehicle.

Figure 2B:
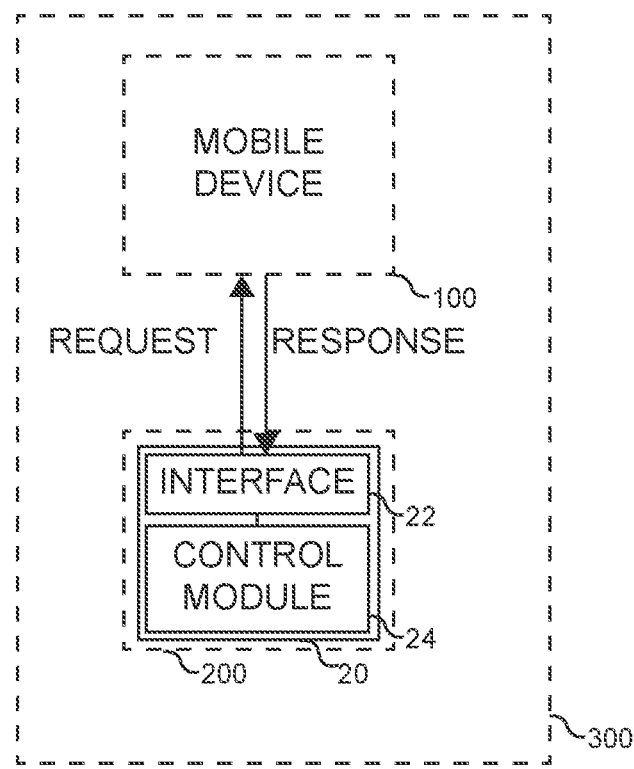
FIG. 2b shows a block diagram of an exemplary embodiment of an apparatus for a base station of a mobile communication system.

FIG. 2b shows a block diagram of an exemplary embodiment of a (corresponding) apparatus 200 for a base station 20 of a mobile communication system 300. The apparatus 20 comprises at least one interface 22 for communicating with a transportation vehicle 100 via the mobile communication system 300. The apparatus 20 comprises a control module 24 that is coupled to the at least one interface 22. The control module 24 may be configured to execute the method of FIG. 2a, e.g., in conjunction with the at least one interface 22. For example, the control module 24 is configured to receive a request from a transportation vehicle 100 via the mobile communication system 300 (via the at least one interface 22). The request relates to a service having a pre-defined QoS requirement. The control module 24 is configured to determine, whether the service is available from the base station 200 at the pre-defined QoS requirement. The control module is configured to determine one or more alternatives to the requested service if the service is unavailable from the base station 200 at the pre-defined QoS. The control module is configured to transmit a response to the request to the transportation vehicle 100 (via the at least one interface 22). The response indicates that the service is unavailable from the base station 200 at the pre-defined QoS requirement. The response comprises information related to the one or more alternatives to the requested service. FIG. 2b further shows the base station, e.g., a stationary base station or a transportation vehicle acting as a base station, comprising the apparatus 20. In some disclosed embodiments, a further stationary or mobile entity of the mobile communication system may comprise the apparatus 20. FIG. 2b further shows a system comprising the base station 200 and the transportation vehicle 100.

The following description relates both to the method introduced in connection with FIG. 2a and to the apparatus 20 introduced in connection with FIG. 2b.

Various disclosed embodiments relate to a method and/or an apparatus for a base station 200 of a mobile communication system 300 (e.g., as introduced in connection with FIGS. 1a to 1b). The method comprises receiving 210 the request from the transportation vehicle 100 via the mobile communication system 300 (e.g., by obtaining the request from a transceiver of the base station 200). The request relates to the service having the pre-defined QoS requirement. In disclosed embodiments, the service may be provided via the base station 200, e.g., a communication link of the service may be established/maintained between the transportation vehicle 100 and the base station 200, and/or the base station 200 may be configured to allocate or reserve wireless resources that may be used for the service. Consequently, the request may indicate, that the transportation vehicle (initially) desires the base station 200 to service the request, by providing the service via the base station 200. At a later stage, e.g., after the updated version of the request is received by the base station 200, the base station be configured to provide at least a part of the service, e.g., by establishing the communication link of the service or by allocating or reserving wireless resources that are to be used for the service.

The method comprises determining 220 whether the service is available from the base station 200 at the pre-defined QoS. For example, the determining 220, whether the service is available from the base station 200 at the pre-defined QoS, may be based on a plurality of wireless resources that are available to the base station 200, and/or a previous allocation of at least a part of the plurality of wireless resources that are available to the base station 200. Additionally or alternatively, the determining 220, whether the service is available from the base station 200 at the pre-defined QoS, may be based on a channel quality and/or based on a predicted channel quality of a wireless channel between the base station 200 and the transportation vehicle. For example, the method may comprise predicting the QoS based on a predicted channel quality of the wireless channel between the base station 200 and the transportation vehicle, e.g., over a pre-defined time interval. If the predicted channel quality "drops" (decreases) under a threshold, the service may be determined to be unavailable from the base station 200 at the pre-defined QoS. For example, the QoS may be predicted with safety margins to achieve a pre-defined confidence interval (e.g., a 90% confidence interval, a 95% confidence interval, a 99% interval). For example, if a 99% confidence interval is desired, the safety margins of the prediction of the QoS may be chosen such, that, statistically, in 99% of cases, the actual wireless channel is at least as good as the prediction of the channel quality indicates.

The method comprises determining 230 one or more alternatives to the requested service, if the service is unavailable from the base station 200 at the pre-defined QoS. If the service is available from the base station 200, the service may be provided via the base station 200, e.g., without sending the response with the information related to the one or more alternatives to the requested service. The one or more alternatives to the requested service may comprise at least a subset of alternatives to the requested service that are provided via the base station 200 of the mobile communication system 300. For example, the method may comprise determining the subset of alternatives to the requested service that are provided via the base station 200 of the mobile communication system 300 based on the plurality of wireless resources that are available to the base station 200, and/or the previous allocation of at least a part of the plurality of wireless resources that are available to the base station 200. Additionally or alternatively, the method may comprise determining the subset of alternatives to the requested service that are provided via the base station 200 of the mobile communication system 300 based on the channel quality and/or based on the predicted channel quality of the wireless channel between the base station 200 and the transportation vehicle.

Additionally or alternatively, the one or more alternatives to the requested service comprises at least a subset of alternatives to the requested service that are provided via a different base station 250 of the mobile communication system 300 or via a base station 310 of a different mobile communication system 320. For example, the method comprise requesting information related to the subset of alternatives to the requested service that are provided via the different base station 250 of the mobile communication system 300 or via the base station 310 of the different mobile communication system 320 from the different base station 250 of the mobile communication system 300 or from the base station 310 of the different mobile communication system 320, e.g., based on the received request from the transportation vehicle 100 and/or by forwarding the received request. The method may comprise receiving the information related to the subset of alternatives to the requested service that are provided via the different base station 250 of the mobile communication system 300 or via the base station 310 of the different mobile communication system 320 from the different base station 250 of the mobile communication system 300 or from the base station 310 of the different mobile communication system 320. The information related to the subset of alternatives to the requested service that are provided via the different base station 250 of the mobile communication system 300 or via the base station 310 of the different mobile communication system 320 may be based on the received request.

In at least some disclosed embodiments, the method may further comprise predicting the QoS of the one or more alternatives. The method may comprise providing the information related to the one or more alternatives with an information related to a predicted QoS of the one or more alternatives to the requested service. The method may comprise determining the information related to the predicted QoS of the one or more alternatives to the requested service by predicting the QoS of the one or more alternatives, e.g., based on a predicted channel quality of a wireless channel between the base station (or the further base station 250 or the base station 310 of the further mobile communication system 320) and the transportation vehicle 100, and/or based on a usage and/or availability of wireless resources. For example, each alternative of the one or more alternatives may be associated with a prediction of a Quality of Service of the alternative, i.e., a prediction, as to which QoS is envisaged in the alternative, and as to and as to how reliable the prediction is (i.e., how likely it is, that the predicted QoS can be provided). For example, the QoS may be predicted using different QoS criteria, e.g., a maximal or average latency, a minimal data transmission rate, a maximal packet loss or error rate, a maximal packet delay variation. The information related to the predicted QoS may indicate for each alternative of the one or more alternatives a QoS that is envisaged in the alternative. For example, the information related to the predicted QoS may comprise for each alternative of the one or more alternatives at least one element of the group of a predicted maximal or average latency, a predicted minimal transmission data rate, a predicted maximal packet loss or error rate, and a predicted maximal packet delay variation. In other words, the predicted QoS may comprise at least one element of the group of a predicted maximal or average latency, a predicted guaranteed or minimal transmission data rate, a predicted maximal packet loss or error rate, and a predicted maximal packet delay variation. Furthermore, the information related to the predicted QoS may indicate for each alternative of the one or more alternatives a confidence interval of the prediction of the QoS (i.e., how reliable the prediction is). In other words, information related to the predicted QoS may comprise information related to a reliability of the prediction of the QoS over a pre-defined time interval. For example, the information related to the predicted QoS may comprise the predicted QoS over one or more pre-defined time intervals of a prediction horizon (e.g., over 5 s, over 10 s and over 15 s) and/or based on one or more confidence intervals (e.g., 90%, 95% and 99%).

The method comprises transmitting 240 the response to the request to the transportation vehicle 100 (e.g., by providing the response to the request to a transceiver of the base station 200).

The at least one interface 22 may correspond to one or more inputs and/or outputs for receiving and/or transmitting information, which may be in digital (bit) values according to a specified code, within a module, between modules or between modules of different entities. In some disclosed embodiments, the at least one interface 22 may comprise or may be coupled to a transceiver of the base station. The transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The at least one interface may be configured to communicate via the mobile communication system via the transceiver. In other words, the transceiver may be configured to communicate via the mobile communication system 300.

In disclosed embodiments the control module 24 may be implemented using one or more processing units, one or more processing devices, any method or mechanism for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

At least some disclosed embodiments are focused on handling a situation, in which a service request (e.g., the request) is denied by the network (e.g., the base station 200). In disclosed embodiments, after a certain QoS request, the network (e.g., the base station 200) may reply with a denial (indicating, that the service is unavailable from the base station 200 at the pre-defined QoS requirement), including a data structure, such as a table, of possible QoS (e.g., the one or more alternatives), e.g., comprising a QoS prediction for a certain time horizon (5 s, 10 s, 20 s) together with confidence/reliability.

At least some disclosed embodiments may thus provide that the UE, e.g., the transportation vehicle 100, requests a certain service with QoS requirements, receives a denial with available other QoS options (e.g., the one or more alternatives), and changes the service request based on the QoS options (e.g., by transmitting the updated request). In some disclosed embodiments, at least some of the available other QoS options may be based on changing the data rate (e.g., the video quality) of the service, based on changing the RAT (e.g., by using a different RAT/mobile communication system with a better QoS), or by changing the service (e.g., audio only instead of video and audio).

In an exemplary embodiment, the QoS of a service may influence a distance that must be kept between transportation vehicles that follow each other, e.g., when using a platooning service. FIG. 3a shows two transportation vehicles 302 and 304 having a distance of 5 m. To achieve such a low distance (e.g., in a coordinated driving or platooning scenario), a coordinated driving service may have a QoS requirement of at most 10 ms latency in its communication.

In some cases, the mobile communication system may support such a stringent QoS requirement. In other cases, a base station of the mobile communication system may indicate, that such a service is unavailable from the base station, and may provide one or more alternatives to the service. As shown in FIG. 3b, each alternative may be provided with a prediction of the QoS over various time intervals and/or various confidence intervals. For example, FIG. 3b may show an alternative having a predicted QoS with a predicted value (P) of the maximal latency of 10 ms at a confidence interval (R for Reliability) of the prediction of 90% (reference sign 312), and a time horizon (i.e., prediction horizon) (H, e.g., the time interval) of 10 s, and a predicted value (P) of the maximal latency of 10 ms at a confidence interval of the prediction of 99% and a time horizon of 30 s (reference sign 314). As shown by reference sign 316, further options may be included (as shown in FIG. 3d).

As shown in FIG. 3c, in this case, the predicted QoS values may be depicted in a three-dimensional graph, with one axis 322 depicting the predicted value P, one axis 324 depicting the confidence interval R, and one axis 326 depicting the time horizon/prediction horizon H.

FIG. 3d shows a response matrix according to an exemplary embodiment. For example, the response matrix may be included in the information related to the predicted QoS of the one or more alternatives to the requested service. FIG. 3d shows columns 332, 334 and 336, which represent different values for confidence intervals of 90%, 95% and 99%, and rows 342, 344 and 346, which represent different values for a time horizon of 5, 10 and 15 seconds. Consequently, at an intersection of a row and a column, a predicted value (here: a maximal latency in milliseconds) at a confidence interval according to its column and at a time horizon according to its row is shown.

Using the response matrix, a function may be defined that takes the response matrix as an input and determines an inter-vehicular distance accordingly, e.g., based on a pre-defined confidence interval and time horizon/prediction horizon.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and disclosed embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Control module
20 Apparatus
22 Interface
24 Control module
100 Transportation vehicle
110 Transmitting a request
120 Receiving a response
130 Transmitting an updated version of the request
200 Base station
210 Receiving a request
220 Determining, whether a service is available from the base station at a QoS requirement
230 Determining one or more alternatives
240 Transmitting a response
250 Further base station
300 Mobile communication system
302, 304 Transportation vehicle
310 Base station
312, 314, 316 Predicted QoS at different confidence intervals and prediction horizons
320 Further mobile communication system
322 Axis for predicted value P
324 Axis for reliability R
326 Axis for prediction horizon
332, 334, 336 Columns of the response matrix
342, 344, 346 Rows of the response matrix

The invention claimed is:

1. An apparatus for a transportation vehicle, the apparatus comprising:
at least one interface for communicating with a base station of a mobile communication system; and
a control module to:
transmit a request to the base station of the mobile communication system, wherein the request relates to a service having a pre-defined Quality of Service (QoS) requirement;
receive a response to the request from the base station, wherein the response indicates that the service is unavailable from the base station at the pre-defined QoS requirement, and wherein the response comprises information related to one or more alternatives to the requested service,
wherein the one or more alternatives to the requested service comprises at least a subset of alternatives to the requested service that are provided via the base station of the mobile communication system,
wherein the subset of alternatives to the requested service that are provided via the base station of the mobile communication system have less stringent QoS properties than the pre-defined QoS requirement, and transmit an updated version of the request, wherein the updated version is based on the one or more alternatives, wherein the updated version of the request is based on an alternative that has a less stringent QoS property than the pre-defined QoS requirement, wherein at least one of (i) at least a part of the subset of alternatives to the requested service that are provided via the base station of the mobile communication system have lower QoS properties than the pre-defined QoS requirement due to a change in a content data rate of the service and (ii) at least a part of the subset of alternatives to the requested service that are provided via the base station of the mobile communication system have less stringent QoS properties than the pre-defined QoS requirement due to a change to a different category of service, and wherein the information related to one or more alternatives to the requested service comprises information related to a predicted QoS of the one or more alternatives to the requested service, wherein the method further comprises selecting one of the one or more alternatives based on the predicted QoS of the one or more alternatives to the requested service.

2. A non-transitory computer readable medium including a program code that enable the control module of claim 1 to operate when the computer program is executed on a computer, a processor, or a programmable hardware component.

3. The apparatus of claim 1, wherein the updated version of the request is transmitted to the base station of the mobile communication system.

4. The apparatus of claim 1, wherein the one or more alternatives to the requested service comprises at least a subset of alternatives to the requested service that are provided via a different base station of the mobile communication system or via a base station of a different mobile communication system.

5. The apparatus of claim 4, wherein at least one of (i) the updated version of the request is transmitted to the different base station of the mobile communication system or to the base station of the different mobile communication system and (ii) the subset of alternatives to the requested service that are provided via a different base station of the mobile communication system or via a base station of a different mobile communication system provide the same service via the different base station of the mobile communication system or via a different radio access technology via the base station of the different mobile communication system.

6. The apparatus of claim 1, wherein the information related to the predicted QoS comprises the predicted QoS over at least one of (i) one or more pre-defined time intervals and (ii) based on one or more confidence intervals.

7. The apparatus of claim 1, wherein at least one of (i) the method is executed by the transportation vehicle (ii) the mobile communication system is a vehicular mobile communication system (iii) the service is a vehicular communication service and (iv) the service is one of a tele-operated driving service, a lane merge assistance service, an overtake assistance service, and a platooning service.

8. An apparatus for a base station of a mobile communication system, the apparatus comprising:

at least one interface for communicating with a transportation vehicle via the mobile communication system; and a control module to:

receive a request from a transportation vehicle via the mobile communication system, wherein the request relates to a service having a pre-defined Quality of Service (QoS) requirement, determine, whether the service is available from the base station at the pre-defined QoS requirement, determine one or more alternatives to the requested service, in response to the service being unavailable from the base station at the pre-defined QoS requirement, wherein the one or more alternatives to the requested service comprises at least a subset of alternatives to the requested service that are provided via the base station of the mobile communication system, wherein the subset of alternatives includes at least one service that is different than the requested service, wherein the subset of alternatives to the requested service that are provided via the base station of the mobile communication system have less stringent QoS properties than the pre-defined QoS requirement, and transmit a response to the request to the transportation vehicle, wherein the response indicates that the service is unavailable from the base station at the pre-defined QoS requirement, and wherein the response comprises information related to the one or more alternatives to the requested service, wherein at least one of (i) at least a part of the subset of alternatives to the requested service that are provided via the base station of the mobile communication system have lower QoS properties than the pre-defined QoS requirement due to a change in a content data rate of the service and (ii) at least a part of the subset of alternatives to the requested service that are provided via the base station of the mobile communication system have less stringent QoS properties than the pre-defined QoS requirement due to a change to a different category of service, and wherein the information related to one or more alternatives to the requested service comprises information related to a predicted QoS of the one or more alternatives to the requested service, wherein the method further comprises selecting one of the one or more alternatives based on the predicted QoS of the one or more alternatives to the requested service.

9. A non-transitory computer readable medium including a program code that enable the control module of claim 8 to operate when the computer program is executed on a computer, a processor, or a programmable hardware component.

10. The apparatus of claim 9, wherein the one or more alternatives to the requested service comprises at least a subset of alternatives to the requested service that are provided via a different base station of the mobile communication system or via a base station of a different mobile communication system.

11. A method for a transportation vehicle, the method comprising:

transmitting a request to a base station of a mobile communication system, wherein the request relates to a service having a pre-defined Quality of Service (QoS) requirement;

receiving a response to the request from the base station, wherein the response indicates that the service is unavailable from the base station at the pre-defined QoS requirement, and wherein the response comprises information related to one or more alternatives to the requested service, wherein the one or more alternatives to the requested service comprises at least a subset of alternatives to the requested service that are provided via the base station of the mobile communication system, wherein the subset of alternatives includes at least one service that is different than the requested service, wherein the subset of alternatives to the requested service that are provided via the base station of the mobile communication system have less stringent QoS properties than the pre-defined QoS requirement; and transmitting an updated version of the request, wherein the updated version is based on the one or more alternatives, wherein the updated version of the request is based on an alternative that has a less stringent QoS property than the pre-defined QoS requirement, wherein at least one of (i) at least a part of the subset of alternatives to the requested service that are provided via the base station of the mobile communication system have lower QoS properties than the pre-defined QoS requirement due to a change in a content data rate of the service and (ii) at least a part of the subset of alternatives to the requested service that are provided via the base station of the mobile communication system have less stringent QoS properties than the pre-defined QoS requirement due to a change to a different category of service, and wherein the information related to one or more alternatives to the requested service comprises information related to a predicted QoS of the one or more alternatives to the requested service, wherein the method further comprises selecting one of the one or more alternatives based on the predicted QoS of the one or more alternatives to the requested service.

12. The method of claim 11, wherein the updated version of the request is transmitted to the base station of the mobile communication system.

13. The method of claim 11, wherein the one or more alternatives to the requested service comprises at least a subset of alternatives to the requested service that are provided via a different base station of the mobile communication system or via a base station of a different mobile communication system.

14. The method of claim 13, wherein at least one of (i) the updated version of the request is transmitted to the different base station of the mobile communication system or to the base station of the different mobile communication system and (ii) the subset of alternatives to the requested service that are provided via a different base station of the mobile communication system or via a base station of a different mobile communication system provide the same service via the different base station of the mobile communication system or via a different radio access technology via the base station of the different mobile communication system.

15. The method of claim 11, wherein the information related to the predicted QoS comprises the predicted QoS over at least one of (i) one or more pre-defined time intervals and (ii) based on one or more confidence intervals.

16. The method of claim 11, wherein at least one of (i) the method is executed by the transportation vehicle (ii) the mobile communication system is a vehicular mobile communication system (iii) the service is a vehicular communication service and (iv) the service is one of a tele-operated driving service, a lane merge assistance service, an overtake assistance service, and a platooning service.

17. A method for a base station of a mobile communication system, the method comprising:

receiving a request from a transportation vehicle via the mobile communication system, wherein the request relates to a service having a pre-defined Quality of Service (QoS) requirement;

determining whether the service is available from the base station at the pre-defined QoS requirement;

determining one or more alternatives to the requested service, in response to the service being unavailable from the base station at the pre-defined QoS requirement, wherein the one or more alternatives to the requested service comprises at least a subset of alternatives to the requested service that are provided via the base station of the mobile communication system, wherein the subset of alternatives includes at least one service that is different than the requested service, wherein the subset of alternatives to the requested service that are provided via the base station of the mobile communication system have less stringent QoS properties than the pre-defined QoS requirement; and transmitting a response to the request to the transportation vehicle, wherein the response indicates that the service is unavailable from the base station at the pre-defined QoS requirement, and wherein the response comprises information related to the one or more alternatives to the requested service, wherein at least one of (i) at least a part of the subset of alternatives to the requested service that are provided via the base station of the mobile communication system have lower QoS properties than the pre-defined QoS requirement due to a change in a content data rate of the service and (ii) at least a part of the subset of alternatives to the requested service that are provided via the base station of the mobile communication system have less stringent QoS properties than the pre-defined QoS requirement due to a change to a different category of service, and wherein the information related to one or more alternatives to the requested service comprises information related to a predicted QoS of the one or more alternatives to the requested service, wherein the method further comprises selecting one of the one or more alternatives based on the predicted QoS of the one or more alternatives to the requested service.

18. The method of claim 17, wherein the one or more alternatives to the requested service comprises at least a subset of alternatives to the requested service that are provided via a different base station of the mobile communication system or via a base station of a different mobile communication system.

* * * * *